106. COMPOSITIONS,
    COATING OR PLASTIC.

90

611,621

Examiner

Crushed Stone
 "    Slag
 "    Oyster Shell
 —    Portland Cem
Dry Paint
Wood Ashes
Strong Vinegar

UNITED STATES PATENT OFFICE.

CHARLES FRENCHEL, OF PHILADELPHIA, PENNSYLVANIA.

COMPOSITION FOR ARTIFICIAL STONE.

SPECIFICATION forming part of Letters Patent No. 611,621, dated October 4, 1898.

Application filed November 19, 1897. Serial No. 659,183. (No specimens.)

*To all whom it may concern:*

Be it known that I, CHARLES FRENCHEL, a citizen of the United States, residing at Philadelphia, in the county of Philadelphia and State of Pennsylvania, have invented a new and useful Composition of Matter for the Formation of Artificial Stone, of which the following is a specification.

My composition consists of the following ingredients, combined in the proportions, viz: crushed stone, thirty-five per cent.; crushed slag, ten per cent.; crushed oyster-shell, five per cent.; Portland cement, forty per cent.; dry paint, five per cent.; ashes of wood, five per cent., said cement, paint, and ashes to be mixed with strong vinegar and water. These ingredients are to be thoroughly commingled by agitation, and after a homogeneous mass has been thus produced it may be molded into various designs of blocks, the top surface being finished to suit the particular use to which the artificial stone is to be put, and after the blocks have been permitted to thoroughly dry they may be removed from the mold and are then ready for use.

In practice it has been found that an artificial stone thus made is many times stronger than natural stone and may be colored to represent any desired stone, and when the upper surface is smooth-finished the broken stone which forms a portion of the composition will appear upon the surface, bringing out a most desirable effect, and it is to be noted that no amount of wear of this surface will affect the appearance, since the crushed stone forming a large per cent. of the composition will appear to whatever depth the stone may be worn.

I am aware that compositions for artificial stone have been used having as ingredients thereof cement; but I am not aware that all the ingredients of my composition in the proportions here stated have been used together; but of course I do not wish to be limited to the exact proportions, as these may be varied to a certain extent without departing from the spirit of my invention.

What I claim, and desire to secure by Letters Patent of the United States, is—

The herein-described composition consisting of crushed stone, crushed slag, crushed oyster-shells, Portland cement, dry paint, wood-ashes, strong vinegar and water, in the proportions specified.

In testimony whereof I have hereunto affixed my signature in the presence of two subscribing witnesses.

CHARLES FRENCHEL.

Witnesses:
  D. LANGAH,
  A. EINHORN.

British patent to Speyser, 2967, Nov. 17, 1865, Scoriaceous,
Kleb, 476,542, June 7, 1882,
Weiland, 186,647, Jan. 23, 1877,
Comine, 218,490, Aug. 12, 1879,